United States Patent [19]
Henderson

[11] 3,801,229
[45] Apr. 2, 1974

[54] COMBINED MOTOR AND ROTARY FLUID DEVICE

[76] Inventor: Standford A. Henderson, 49 Wansfell Rd., Snyder, N.Y.

[22] Filed: July 27, 1972

[21] Appl. No.: 275,529

[52] U.S. Cl. .................................. 417/359, 417/363
[51] Int. Cl. ...................... F04b 17/00, F04b 35/00
[58] Field of Search .......... 417/359, 360, 363, 405, 417/410, 423 R; 92/128; 415/119

[56] References Cited
UNITED STATES PATENTS

| 3,610,781 | 10/1971 | Kolb et al. | 417/360 X |
| 3,468,260 | 9/1969 | Belden | 417/410 X |
| 2,928,961 | 3/1960 | Morrill | 417/363 X |
| 3,179,058 | 4/1965 | Meagher | 417/363 X |
| 2,285,050 | 6/1942 | Pezzillo | 417/363 X |

Primary Examiner—Carlton R. Croyle
Assistant Examiner—Richard Sher
Attorney, Agent, or Firm—Joseph P. Gastel

[57] ABSTRACT

A combined motor and rotary fluid device including a fluid unit having a housing and a rotor within said housing, motor means, and a mounting structure for mounting said fluid unit relative to said motor means including a plurality of posts extending outwardly from said motor for supporting rings clamping a resilient diaphragm therebetween on which said fluid unit housing is mounted, and a shaft extending outwardly from said motor for mounting the rotor of said fluid unit, said resilient diaphragm permitting a floating movement of said housing.

9 Claims, 11 Drawing Figures

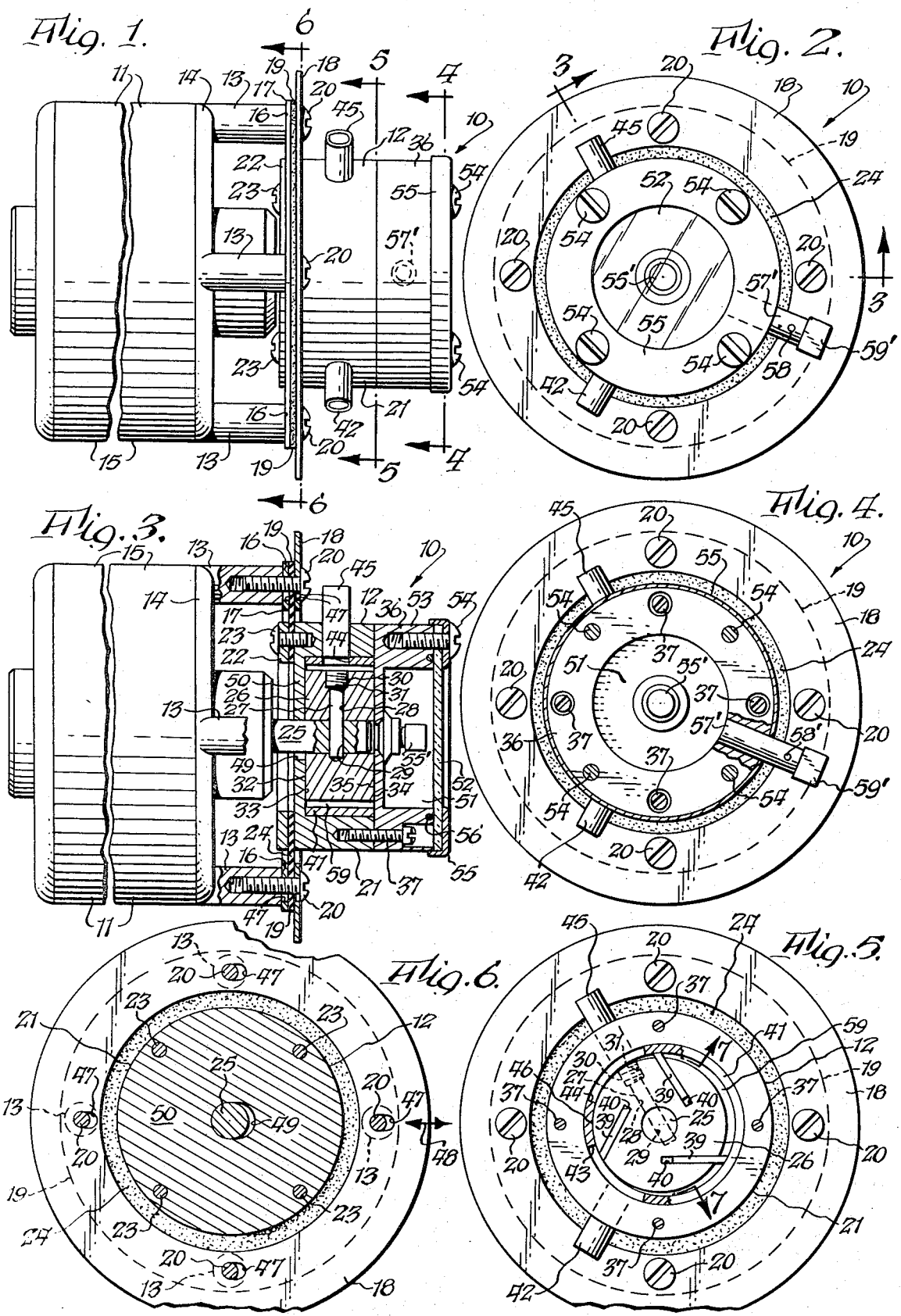

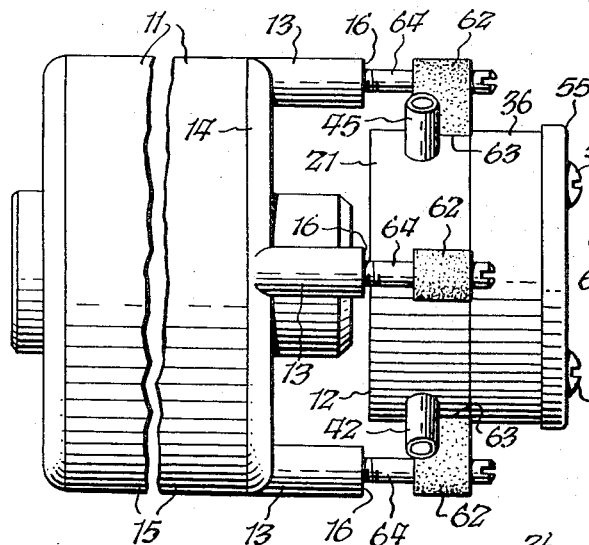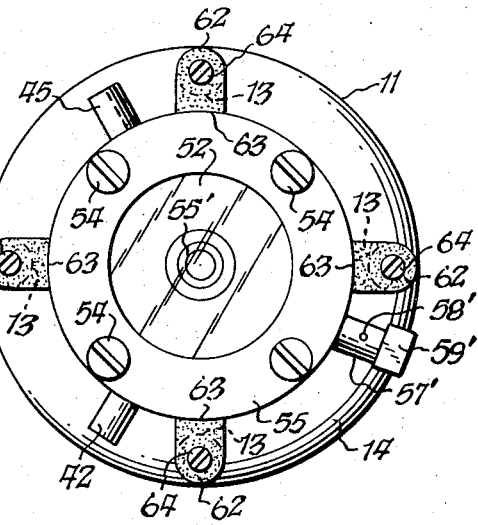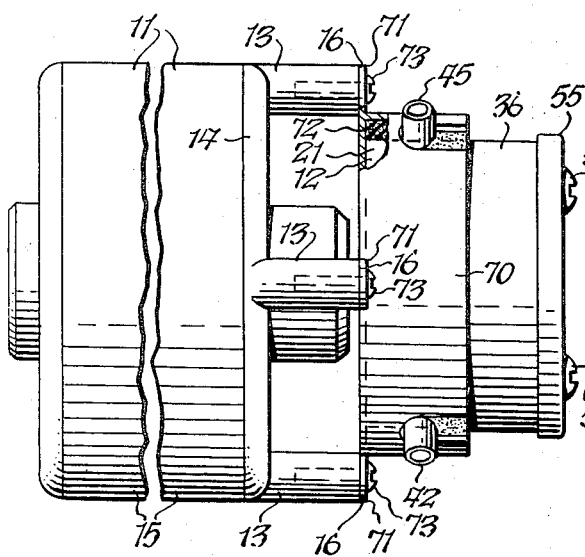

COMBINED MOTOR AND ROTARY FLUID DEVICE

The present invention relates to an improved combination of a motor and a rotary fluid device.

In the past combined motor and rotary fluid devices, such as motor-pump units and the like, required precise alignment between the motor and the pump in order to operate properly. This in turn required specialized fixtures and close machining tolerances, which not only increased the cost of the units, but if there were any departures, the capacity of the pump was greatly reduced because of friction and binding between the pump rotor and the pump housing. In short, the assembling of prior combined motor-pump units was a time consuming and expenive operation.

It is accordingly one object of the present invention to provide an improved combined motor and fluid device which can be assembled simply and easily without the use of specialized fixtures. A related object of the present invention is to provide an improved combined motor and fluid device which does not require precise machining tolerances. A further related object of the present invention is to provide a combined motor and fluid rotary device in which the rotor of the fluid device can be adjusted for optimum operation during assembly and which does not require a prolonged break-in period. Another related object of the present invention is to provide an improved combined motor and fluid associated device in which the housing of the fluid associated device is mounted for floating movement which produces silent operation. Other objects and attendant advantages of the present invention will readily be perceived hereafter.

The improved combined motor and fluid device comprises a fluid unit having a housing and a rotor mounted within said housing, motor means, and mounting means for mounting said fluid unit relative to said motor means to permit limited floating movement of said fluid unit during rotation of said rotor to thereby provide a good sealing contact between said rotor and said housing without binding. In accordance with another aspect of the present invention, the housing is adjustable during the assembly of the combined motor and fluid unit to provide for maximum efficiency of the fluid unit.

The various aspects of the present invention will be more fully understood when the following portions of the specification are read in conjunction with the accompanying drawings wherein:

FIG. 1 is a fragmentary side elevational view of one form of the improved combined motor and rotary fluid device of the present invention;

FIG. 2 is an end elevational view taken from the right of FIG. 1;

FIG. 3 is a fragmentary side elevational view, partially in cross section taken substantially along line 3—3 of FIG. 2;

FIG. 4 is a cross sectional view taken substantially along line 4—4 of FIG. 1 and showing the pump with the cover of the oil reservoir removed;

FIG. 5 is a fragmentary cross sectional view taken substantially along line 5—5 of FIG. 1 and showing the rotor mounted within the pump housing;

FIG. 6 is a fragmentary cross sectional view taken substantially along line 6—6 of FIG. 1 and showing the construction for shifting the housing radially with respect to the rotor to adjust the relative positions therebetween;

FIG. 7 is a fragmentary cross sectional view taken substantially in the direction of arrows 7—7 of FIG. 5 and showing the porting in the lining of the housing;

FIG. 8 is a fragmentary side elevational view showing a modified form of the present invention;

FIG. 9 is an end elevational view taken from the right of FIG. 8;

FIG. 10 is a fragmentary side elevational view showing still another form of the present invention; and FIG. 11 is an end elevational view of the embodiment of FIG. 10 taken from the right of FIG. 10.

The improved combined motor and rotary fluid device of the present invention in the present instance comprises an electric motor 11 having a fluid unit, namely, pump 12 secured thereto in permanently coupled relationship. It will be appreciated that while motor 11 is shown as an electric motor, it can comprise any suitable type of motor such as a hydraulic motor or a pneumatic motor. The fluid device, which is shown as a pump 12, can also be a compressor and can be used for handling any type of fluid. The principles of construction of the pump 12 may also be applied to a fluid operated motor. In short, while the present specification uses a pump 12 for explanatory purposes, it will be understood that the term fluid device, as used in the present specification and claims, means any device having a housing and a rotor for moving fluid, compressing a gas, or being actuated by fluid.

In the past, the aligning of pump 12 and motor 11 during assembly was a great problem which required specialized fixtures and close machining tolerances. This not only increased the cost of the units, but if there were any departures, the capacity of the pump was greatly reduced because of friction and binding between the rotor and housing, as will become more apparent hereafter.

The construction of the present invention overcomes the foregoing shortcomings by causing the fluid unit, namely, pump 12 to be floatingly mounted relative to motor 11. Thus, the parts need not be machined as accurately as if the floating movement were not present. Furthermore the pump 12 will be capable of being operated by a relatively small motor because binding due to friction resulting from misalignment between the housing and rotor is virtually eliminated because pump 12 can float during operation.

For mounting pump 12, four posts 13, spaced 90° to each other, are formed integrally with end plate 14 of housing 15 of motor 11. Mounted on the ends 16 of the posts 13 are annular planar metal rings 17 and 18 which sandwich the outer edge of flexible rubber diaphragm 19 therebetween. Screws 20 thread into posts 13 to hold rings 17 and 18 and diaphragm 19 in assembled relationship on posts 13.

A pump housing 21 is mounted on diaphragm 19 by means of annular planar metal ring 22 which is secured to housing 21 by means of four screws 23 spaced 90° to each other. Diaphragm 19 is clamped securely between ring 22 and housing 21. As can best be seen from FIG. 3, there is a free unsupported central annular portion 24 of the flexible diaphragm 19 between the inner edges of annular rings 17 and 18 on one hand and the outer edge of annular ring 22 and motor housing 21 on the other hand. Ring 18 is of larger diameter than ring 17 and is used to mount unit 10 on a frame (not shown).

A shaft 25 extends outwardly from motor 11 and has a rotor 26 fixedly mounted thereon by means of pin 27 which extends through aligned bores 28 and 29 in rotor 26 and shaft 25, respectively, and which has a threaded head 30 which screws into tapped bore 31 in rotor 26 to maintain rotor 26 in assembled relationship on shaft 25. Pin 27 is installed through conduit 45 when bores 28 and 29 are in alignment therewith.

As can be seen from FIG. 3, side 32 of rotor 26 fits closely against side 33 of housing 21 and side 34 of rotor 26 fits tightly against side 35 of cap 36 which is secured to housing 21 by means of screws 37. It will be appreciated that because the fit between the sides 32-33 and 34-35 of the rotor and housing are extremely close, namely, on the order of .0003 of an inch throughout their common border, and considering that rotor 26 is rigidly secured to shaft 25, if the sides 33 and 35 of the housing were not substantially perpendicular to the axis of the shaft 25 within the foregoing limits, there would be either binding between the sides 32 and 34 of the rotor and the sides of the housing which they engage or excessive clearance. Furthermore, this exact alignment in the past depended on the accuracy with which surfaces 16 of posts 13 were machined, which, in turn, required not only expensive fixtures but also great care in machining. In this respect it can be seen that if the sides of the rotor were perfectly parallel and if the mating surfaces 33 and 35 of the housing were also perfectly parallel, there could still be misalignment which could result in binding between the mating surfaces if surfaces 16 of posts 13 were not machined perfectly perpendicularly to the axis of shaft 25. However, because of the fact that there is an unsupported central portion of diaphragm 24 which mounts housing 21, the above accurate machining of posts 13 at surfaces 16 is not required because the flexibility of central portion of diaphragm 19 causes housing 21 to float during rotation of rotor 26, thereby obviating potential binding between the sides of the rotor and the sides of the housing. In other words, diaphragm 19 provides limited axial movement of housing 21 to obviate the necessity of close machining tolerances at posts 13. In addition diaphragm 19 provides limited radial movement for housing 21.

In the present pump, vanes 39 are mounted in slots 40 of rotor 26 and they extend outwardly and frictionally engage liner 41 which is pressed into housing 21. A fluid inlet conduit 42 extends through housing 21 and is in communication with slot 43 (FIGS. 5 and 7) in liner 41. It can thus be seen that as rotor 26 rotates in a clockwise direction in FIG. 5, the vanes 39 will sweep across slot 43 to move fluid from conduit 42 to slot 44 in liner 41 which is in communication with outlet conduit 45 which extends through housing 21.

In order to effect efficient pumping, there must be contact between rotor 26 and liner 41 at point 46 (FIG. 5). In order to effect such contact without excessive friction, housing 21 is adjusted radially relative to rotor 26 after the latter has been securely mounted on shaft 25. To this end a plurality of elongated slots 47 are formed in annular rings 17 and 18 and diaphragm 19. Screws 20 extend through these slots and when these screws are loosened, rings 17 and 18 and diaphragm 20 may be moved as a unit relative to rotor 46 in the direction of arrows 48 which extend in the direction of the longitudinal axes of slots 47. Since motor housing 21 is securely mounted on the inside portion of diaphragm 19 by means of annular ring 22, as described in detail above, the entire housing 21 and diaphragm assembly can move radially relative to rotor 26 until such time as the desired degree of contact is realized between rotor 26 and liner 41 at point 46. This radial movement of housing 21 can be achieved because motor shaft 25 fits through elongated slot 49 in wall 50 of housing 21. It will be appreciated that there is no leakage through slot 49 because of the tight engagement between side 32 of the rotor and side 33 of the housing (FIG. 3).

As noted above, a cap 36 is secured to housing 21. Cap 36 includes a chamber 51 which houses a supply of lubricating oil and a glass plate 52 is secured to the annular wall 53 of cap 36 by means of screws 54 which extend through annular retaining ring 55 and are received in wall 53 of cap 36. An O-ring or other suitable seal 56 is located between plate 52 and wall 53. An air inlet tube 57' having an air inlet aperture 58' therein and a closure cap 59' thereon is in communication with chamber 51 through wall 53 and a check valve, not shown, is located in tube 57' so as to permit air to enter chamber 51 and prevent reverse flow of any air or liquid from chamber 51. A second check valve 55' is mounted on wall 34, and this check valve permits flow of oil into rotor chamber 59 but prevents reverse flow into chamber 51. Essentially the lubrication of rotor 26 is effected in the following manner: Whenever the air within chamber 51 heats up due to heat produced by rotation of rotor 26, check valve 55' will be forced open to permit lubricant to enter chamber 59. At this time the check valve in conduit 57' will remain closed. After the pump 11 stops and the air in chamber 51 cools down, the vacuum created due to the movement of oil from chamber 51 will permit air to enter chamber 51 through check valve in conduit 57'. This does not form a part of the present invention and the mode of operation can be more clearly understood by reference to my previous U.S. Pat. No. 3,454,138. It will be appreciated that conduit 57' may be connected to a larger lubricant tank (not shown) by removing cap 59' and attaching a conduit leading from the tank to conduit 57', and also sealing aperture 58'.

There are a number of advantages to the above described construction. First of all, the annular rings 17 and 18, being highly conductive, will radiate heat to prevent overheating of motor 11. Furthermore, the diaphragm 19 permits axial movment of housing 21 as required and in addition functions to silence the operation of pump 11. The floating mounting of housing 21 obviates the necessity for close tolerances on the mounting posts 13, as described in detail above. Furthermore, the housing 21 has a certain degree of radial float, as limited by the elasticity of diaphragm 19. Furthermore, the pump housing can be fabricated from a die casting which further lessens the cost of the unit. As noted above, special tools for checking accuracy of the aligment of the various parts are not needed because of the floating mounting of housing 21, and furthermore because of the fact that housing 21 does float there need not be a relatively long break-in period of the pump which would otherwise be required in the absence of the floating mounting.

An alternate embodiment of the present invention is shown in FIGS. 8 and 9. All elements of the motor 11 and the pump 12 are identical to those described above with respect to FIGS. 1–7 and therefore in the interest of brevity additional description of this subject matter will not be made. However, the means for mounting pump 12 on motor 11 are different from that described in FIGS. 1–7, but they accomplish the same purpose. More specifically, a plurality of lugs 62 have their inner ends 63 suitably bonded to the outside of pump housing 21. Lugs 62 have bores therein which fit closely on pins 64 which are parallel to each other and threaded into posts 13 mounted on motor housing 15. Because there is a sliding fit between lugs 62 and pins 64, housing 21 can move axially as required during rotation of the rotor. Furthermore, because lugs 62 are fabricated from a resilient material such as rubber there will be a limited radial floating capability provided by lugs 62 so that there will be a limited radial movement of housing 21 as determined by the resiliency of lugs 62.

In the embodiment of FIGS. 8–9, there is no structure shown for moving housing 21 radially relative to the rotor contained therein in the manner described above relative to FIGS. 1–7. However, if this capability is desired, it can be accomplished by providing a suitable radial adjustment.

In FIGS. 10 and 11 a still further embodiment of the present invention is shown and in this embodiment motor 11 and pump 12 are identical in all respects to these members having the same numerals described above with respect to FIGS. 1–9. However, the means for mounting pump 12 on motor 11 differs. In this respect a cylindrical cup 70 is provided with tabs 71 at one end which are mounted on posts 13 of motor 11 by screws 73. Pump housing 21 can be adjusted radially with respect to the rotor contained therein so as to have contact between the rotor 26 and the housing liner 41 at 46, as described above in detail relative to FIG. 6, and the pump housing 21 is held in this position relative to cup 70. Thereafter, a filling 72 of silicone rubber or other suitable compound is flowed into cup 70 in the liquid state and permitted to harden and this silicone rubber acts in every respect the same way as resilient diaphragm 19 described above with respect to FIGS. 1–7 in the sense that it permits limited axial and radial floating movement of housing 21, as required.

While the present invention has been described relative to fluid devices which are rotary, it will be appreciated that it need not necessarily be so limited.

It can thus be seen that the various embodiments of the present invention achieve the above enumerated objects and while only certain embodiments have been disclosed, it will be appreciated that the present invention can be embodied otherwise within the scope of the following claims.

What is claimed is:

1. A combined motor and rotary fluid device comprising a fluid unit including a housing and a rotor mounted in sealing relationship relative to said housing, motor means, mounting means for mounting said fluid unit relative to said motor means to permit limited floating movement of said fluid unit during rotation of said rotor to therby provide good sealing contact between said rotor and said housing without binding, said motor means including shaft means and wherein said rotor is mounted on said shaft means and wherein said mounting means resiliently mount said housing relative to said motor means, said mounting means comprising a resilient diaphragm having a first portion secured to said motor means and a second portion secured to said housing, and a resilient portion between said first and second portions.

2. A combined motor and rotary fluid device as set forth in claim 1 including adjustment means for permitting selective limited radial movement of said housing during the mounting of said housing on said motor means, to thereby adjust the relative positions of said rotor and said housing.

3. A combined motor and rotary fluid device as set forth in claim 2 wherein said adjustment means comprise elongated slots in said first portion, fastener means extending through said elongated slots to permit radial movement of said resilient diaphragm when said fastener means are in a loosened condition but which clamp said first portion of said diaphragm to said motor means when said fastener means are in a tightened condition.

4. A combined motor and rotary fluid device as set forth in claim 3 including a second elongated slot in said housing through which said shaft means extends for permitting said radial movement of said housing.

5. A combined motor and rotary fluid device comprising a fluid unit including a housing and a rotor mounted in sealing relationship relative to said housing, motor means, mounting means for mounting said fluid unit relative to said motor means to permit limited floating movement of said fluid unit during rotation of said rotor to thereby provide good sealing contact between said rotor and said housing without binding, said motor means including shaft means and wherein said rotor is mounted on said shaft means, and wherein said mounting means comprise first means on said motor means and second means on said housing for effecting sliding movement relative to said first means in a direction substantially axially of said shaft means during operation of said motor means.

6. A combined motor and rotary fluid device as set forth in claim 5 wherein said first means comprise a plurality of substantially parallel pins extending from said motor means in a direction substantially axially of said shaft means, and wherein said second means comprise means including a plurality of bores effectively located in said housing for receiving said pins with a sliding fit.

7. A combined motor and rotary fluid device as set forth in claim 6 wherein said second means comprise resilient members on said housing for permitting limited radial movement of said housing relative to said shaft means.

8. A combined motor and rotary fluid device as set forth in claim 7 wherein said resilient members comprise lobe-like members secured to and extending outwardly from said housing.

9. A combined motor and rotary fluid device comprising a fluid unit including a housing and a rotor mounted in sealing relationship relative to said housing, motor means, mounting means for mounting said fluid unit relative to said motor means to permit limited floating movement of said fluid unit during rotation of said rotor to thereby provide good sealing contact between said rotor and said housing without binding, said motor means including shaft means and wherein said rotor is mounted on said shaft means and wherein said mounting means resiliently mount said housing relative to said motor means, said mounting means comprising a cup-like member secured to said motor means and wherein said housing is positioned within said cup-like member, and a filling of resilient material within said cup-like member for supporting said housing.

* * * * *